FIP8502 XR 3,692,168 SR

United States Patent [15] 3,692,168
Hughes, Jr. et al. [45] Sept. 19, 1972

[54] MANIPULATION OF SEMICONDUCTOR ELEMENTS BY MAGNETIC MEANS

[72] Inventors: Harry E. Hughes, Jr., Reading, Pa.; Jack A. Morton, South Branch, N.J.; Meyer H. Wachs, Reading, Pa.

[73] Assignee: Bell Telephone Laboratories Incorporated, Murray Hill, Berkeley Heights, N.J.

[22] Filed: Sept. 4, 1970

[21] Appl. No.: 69,823

Related U.S. Application Data

[62] Division of Ser. No. 792,490, Jan. 21, 1969.

[52] U.S. Cl. ....................................... 198/41, 310/12
[51] Int. Cl. ............................................ B65g 47/00
[58] Field of Search .............. 198/41; 310/12, 13, 14; 271/DIG. 3, 65 A, 18.1

[56] References Cited

UNITED STATES PATENTS

| | | | |
|---|---|---|---|
| 2,831,131 | 4/1958 | Klotz | 310/13 |
| 754,637 | 3/1904 | Brikeland | 310/14 |
| 3,353,822 | 11/1967 | Dangelmaier et al. | 271/18 A |

*Primary Examiner*—Richard E. Aegerter
*Assistant Examiner*—Douglas D. Watts
*Attorney*—R. J. Guenther and Edwin B. Cane

[57] ABSTRACT

Ferromagnetic material is included selectively in semiconductor elements to enable handling of such elements during fabrication by means of magnetic fields. The invention is particularly, although not exclusively, adapted to beam leaded semiconductor devices in which ferromagnetic material may be included selectively in the beam leads as well as in or on the semiconductor body itself. Magnetic manipulation for a wide variety of purposes is disclosed.

2 Claims, 8 Drawing Figures

INVENTORS H. E. HUGHES, JR
J. A. MORTON
M. H. WACHS
BY H W Lockhart
ATTORNEY

MANIPULATION OF SEMICONDUCTOR ELEMENTS BY MAGNETIC MEANS

This is a division of U.S. application Ser. No. 792,490, filed Jan. 21, 1969, in the name of Harry E. Hughes, Jr., Jack A. Morton, and Meyer H. Wachs.

This invention relates to semiconductor devices, and particularly to techniques for handling semiconductor elements during fabrication and assembly.

Semiconductor devices, whether of the discrete element type such as a single transistor or diode or comprising a plurality of such devices combined with other passive elements to form an integrated circuit, are fabricated in multiple arrays from thin slices of single crystal semiconductor material. It is believed that the techniques generally employed are well known but in general, such processing begins with the fabrication of a thin polished slice of single crystal material formed by slicing across a single crystal ingot which may have a diameter of about 1 inch or more. The thin polished slice then is subjected to a succession of photoresist masking, impurity diffusion and metal deposition operations to form an array of semiconductor devices which may range from several hundred to several thousand depending on the size and complexity of each individual element. However, even for larger semiconductor elements dimensions may not exceed 100 mils on a side and consequently these elements or chips, as formed out of the slice material, are extremely difficult to handle in the subsequent fabrication steps required to finally assemble them into the finished apparatus form.

These individual chips are extremely delicate, easily damaged and do not lend themselves to the modes of orientation and mounting generally available for more sizable electronic equipment. For example, an integrated circuit element may be less than 3 mils in thickness and perhaps 100 by 150 mils. Heretofore, such chips have been handled using largely hand methods akin to those employed in watch making practice. However, the need for cleanliness and noncontaminating tools and ambients is even greater in the semiconductor field than in that field. Moreover, considerable skill is required on the part of operators using tools such as tweezers or vacuum probes. Most of the operations must be carried out under microscopes adding even greater difficulties to the processing. Also, it is necessary to temporarily mount the semiconductor material either in slice or chip form for chemical or mechanical processing, testing or shipping. This has previously been done using adhesive materials of various types which present difficulties from the standpoint of both demounting and contamination.

In accordance with this invention, thin films of ferromagnetic material are provided within or upon the semiconductor bodies advantageously as a part of the metal deposition steps so as to enable, subsequently, the handling of the chips during and after separation from slice form and during later fabrication steps. More particularly, ferromagnetic films are incorporated in accordance with particular patterns in order to enhance the magnetic attraction for the particular intended application. For example, films may be formed in accordance with particular shapes to enable orientation of the chip during subsequent processing. Ferromagnetic material may be distributed within the semiconductor element so as to enable sure and adequate placement or hold-down of the chip for electrical testing or during lead bonding operations. In a particularly advantageous arrangement, semiconductor devices of the beam lead type such as are disclosed in U.S. Pat. No. 3,335,338, granted to M. P. Lepselter, Aug. 8, 1967, ferromagnetic material may be included within some or all of the beam leads.

By way of explanation, the term "ferrogmagnetic", as used herein, is defined as relating to a class of substances characterized by abnormally high magnetic permeability, definite saturation point, and appreciable residual magnetism and hysteresis. It is not confined to materials which include iron or compounds thereof.

Although it is known previously to handle semiconductor devices by magnetic means, such techniques have involved encapsulated devices in which the metallic external leads otherwise provided as a part of the completed device are used as the magnetic members. In addition, devices are also known in which an electrical testing operation ejects a magnetic ink upon unsatisfactory elements in an array which then are removed from the array by magnetic means. However, in accordance with this invention magnetic films are provided within or upon semiconductor bodies so as to enable their manipulation, including transfer, after separation from the slice array and using magnetic means, to locations required for final assembly into circuit form. Moreover, by suitably distributing the magnetic films within the individual semiconductor elements, oriented positioning is enabled. Reference is here made to the concurrently filed application of Butherus-Huffstutler-Morton, Ser. No. 792,487, assigned to the same assignee as this application, now abandoned.

These and other applications of the invention will be more readily understood from the following detailed description taken in connection with the drawing in which.

Figures 1, 2:
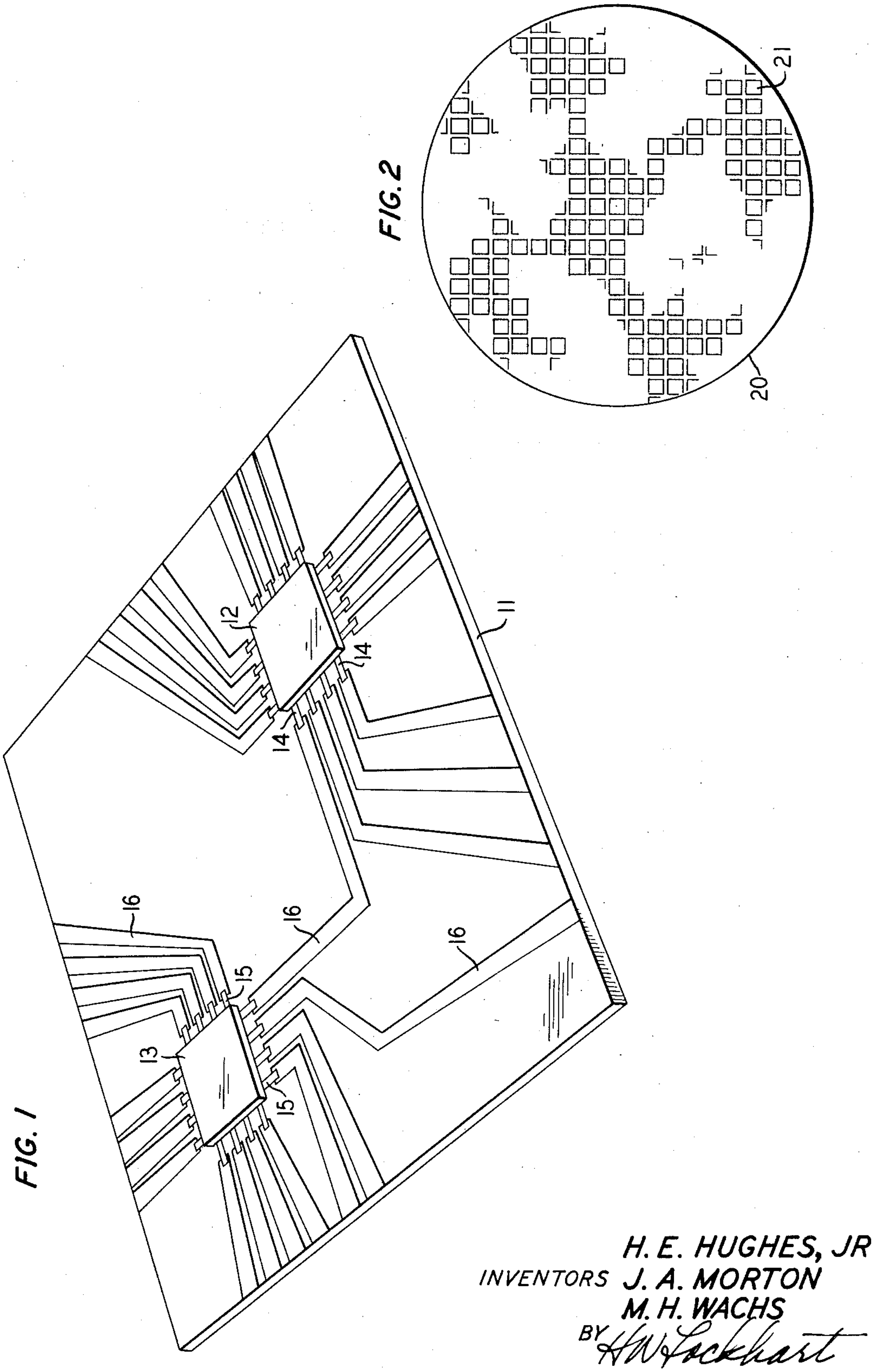
FIG. 1 is an isometric view of a circuit substrate having a pair of beam leaded semiconductor elements mounted thereon.
FIG. 2 is a plan view of a portion of a semiconductor slice showing an array of beam leaded semiconductor elements formed therein prior to their separation.

FIGS. 1 and 2 depict typical stages of semiconductor device fabrication to which the subject invention is applicable. FIG. 1 shows a ceramic mounting board 11 having conductive paths 16, typically of deposited metal such as gold, on the surface and a pair of beam-leaded semiconductor elements 12 and 13 mounted thereon. In this particular embodiment the semiconductor elements 12 and 13 are affixed to the mounting board 11 by bonding the beam leads 14 and 15 of the elements to terminal portions of the several conductive paths 16.

The semiconductor elements 12 and 13 are, in turn, fabricated in the multiple array as shown in a generalized form in FIG. 2. As is known in the art the array is separated into individual elements by mechanical, or specifically in the case of beam-leaded devices, by chemical means. It is advantageous to the assembly procedure to retain the known orientation of the semiconductor element in the slice array during the handling process to enable placement upon the mounting board to ensure proper interconnection of device to conductive pattern.

It will be understood that the foregoing description is exemplary. The semiconductor elements 12 and 13 are shown with 16 beam leads in a substantially symmetrical arrangement. However, the number and arrangement of beam leads may vary greatly. Moreover, the invention is not restricted to beam leaded semiconductor elements.

Figure 3:
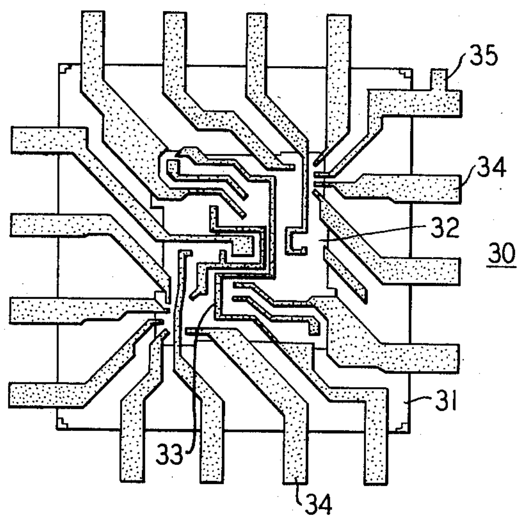
FIG. 3 is a more detailed plan view of a single beam lead semiconductor element.

The mounting board 11 in this particular embodiment is ceramic and of typical dimensions and shape suitable for further assembly into electronic apparatus. This portion of the specific disclosure, particularly with reference to FIGS. 1, 2 and 3 is for the purpose of illustrating the need for and usefulness of the invention. For example, to further accentuate the problems in handling and positioning typical semiconductor devices in the context of the foregoing, the elements 12 and 13 typically have dimensions of 100 mils by 100 mils or less. The mounting board 11 may be an inch or a fraction thereof in width and not more than several inches in length. All of this emphasizes the problem in providing rapid, accurate and economical handling and assembly of semiconductor devices and apparatus.

FIG. 3 shows in greater detail one of the beam leaded elements 30 comprising a silicon chip 31 having a plurality of functional elements within the diffusion boundary 32, interconnected by the metal members 33 and having external connecting members comprising beam leads 34. On one beam lead a projecting tab 35 is shown for visual orientation of the device in accordance with prior methods.

Figure 4:
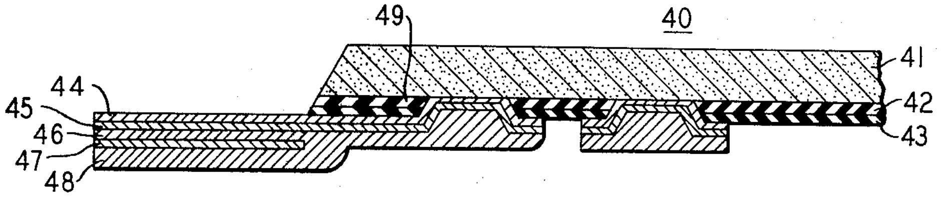
FIGS. 4, 5 and 6 are sections of a portion of a beam lead semiconductor element showing several arrangements for including magnetic material therein.
Figure 5:
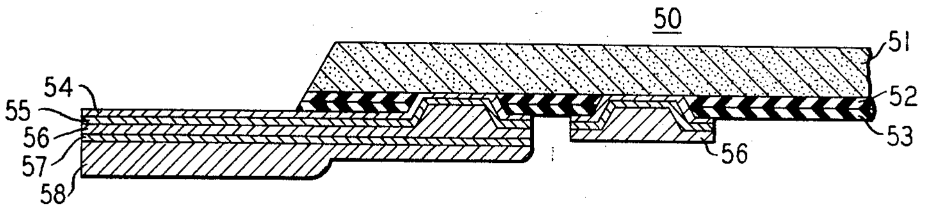
Figure 6:
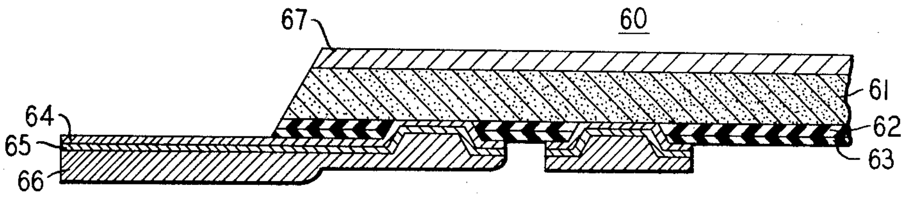

Referring to FIGS. 4, 5 and 6, several arrangements are shown for including a layer of ferromagnetic material within the semiconductor element during the fabrication thereof. A variety of magnetic materials may be used including both hard magnetic and soft magnetic types.

In this connection the relative terms "hard" and "-soft" refer to the value of the energy product $(BH)_{max}$ in energy units per unit volume for particular material. The following is an exemplary, but partial, listing of ferromagnetic materials:

| Alloy | $(BH_{max}) \times 10^{-6}$, gauss-oersted | Remarks |
|---|---|---|
| Fe + Hi (20–50%) | 0.0005 to 0.0008 | Very high permeability, annealed, may be electroplated |
| Fe + 0.6% C | 0.18 | Plain carbon steel |
| Fe + 35% Co | 0.96 | A special magnet steel |
| Alnico | 1.6 | Powder metallurgy, permanent magnets |
| Ticonal GX | 7.5 | Cast yokes for hi-fi speakers |
| Pt—Co alloy | 4 or greater | |
| Pt-Co intermetallic compound in ordered state | ≈10 | |

Generally, the selection of a ferromagnetic material will depend on the particular application to be made of the magnetic properties as well as by the method by which the material is deposited. For example, deposition techniques may include plating, evaporation, sputtering and the like.

Again, the manner in which the film is included is governed by the application to be made as well as by the particular fabrication process being employed. Referring to FIG. 4, a film 47 of ferromagnetic material is incorporated in the thickened portion of a typical beam lead structure prior to deposition of the final thick gold film 48. In this configuration the lead is on the underside of the semiconductor body 41 to enable bonding to a conducive pattern on a substrate. The assembly 40 comprises a semiconductor body 41 of silicon which may include one or more diffused zones so as to constitute a transistor, resistor or diode. On the lower surface 49 is a thin layer 42 of silicon dioxide and an overlayer 43 of silicon nitride, both dielectrics, for passivation purposes. Deposited over the dielectric layers are successive layers of titanium 44, platinum 45 and gold 48 with the previously referred to intervening layer 47 of ferromagnetic material. This particular arrangement of the ferromagnetic material is called a tab configuration.

In FIG. 5 the ferromagnetic material is provided in what is termed a lamina configuration in which the film 57 is applied on top of an initial gold beam lead plating 56. An additional layer 58 of gold is applied to form the beam lead. The structure is similar to that shown in FIG. 4, except that the magnetic material extends over the entire length of both the beam lead and contact area.

Specifically, semiconductor body 51 is silicon, layers 52 and 53 are silicon dioxide and silicon nitride, layer 54 is titanium, layer 55 platinum and layers 56 and 58 both gold, and layer 57 is ferromagnetic material.

In FIG. 6 the film 67 of magnetic material is applied to the back or upper surface of the silicon semiconductor body. Again, body 61 is of silicon, layers 62 and 63 are silicon oxide and silicon nitride respectively, and layers 64, 65 and 66 are, respectively, titanium, platinum and gold.

It will be appreciated, of course, that these configurations may be combined in various ways. For example, the configuration of FIG. 6 may be combined with either of the arrangements shown in FIGS. 4 and 5 in order to enable both ease of handling and hold-down of the beam leads for bonding and orientation. Moreover, the film 67 on the surface of the semiconductor may be applied in accordance with a particular pattern or shape for orientation purposes.

The ferromagnetic films in any of the forgoing described arrangements are readily applied using techniques well known in the art. Electroplating from solution is a common and well-developed method which can be utilized in connection with the masking techniques which are already a part of semiconductor device fabrication. Likewise, sputtering and evaporation techniques may be used, particularly for those materials which cannot be plated. In particular, the ferromagnetic films may be included in the device structures while the fabrication process is still being applied to the entire semiconductor slice. Both the materials and methods used are compatible with present semiconductor device technology.

Patterns of ferromagnetic material may be produced both by selective deposition using suitable masks and by selective etching likewise using masks. The mass of ferromagnetic material required is not excessive and satisfactory results have been achieved using films of from about 0.5 to about 0.75 mils thick.

Figure 7:
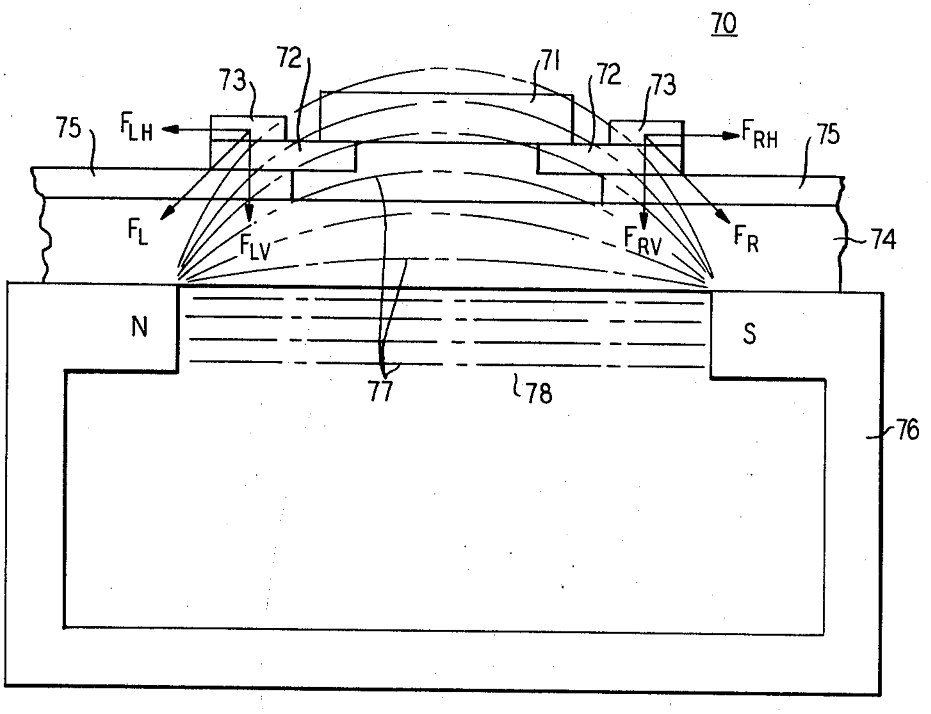
FIG. 7 is a schematic view illustrating the principles of retaining a beam leaded semiconductor element using magnetic means.

Referring to FIG. 7, the effectiveness of magnetic means for handling and positioning a semiconductor element which includes ferromagnetic material is illustrated by a schematic representation showing the lines of magnetic force as broken lines and with vectors indicating the forces acting on the element. In FIG. 7 there is shown a magnetic circuit 76 with an air gap 78 and, as noted above, the lines of magnetic force 77, constituting a portion of the field, emanating therefrom over the magnet. Positioned with respect to the air gap is the substrate 74 and conductive lead 75 upon which the semiconductor element 71 and beam leads 72 are to be permanently affixed. In this specific instance the semiconductor element contains a ferromagnetic film 73 in both of the opposing beam leads shown in this view. Because of the configuration of the magnetic field it can be seen that the forces (vectors $F_L$ and $F_R$) affecting each magnetic film 73 can be separated into components acting outwardly (vectors $F_{LH}$ and $F_{RH}$) in equal and opposite amounts when the element is centered over the air gap as well as downwardly (vectors $R_{LV}$ and $F_{RV}$). In this manner the magnetic means ensure intimate contact or holddown of the beam leads 72 of the semiconductor element 71 in the proper position relative to the substrate 74. This is important in order to enable proper bonding of the beam leads 72 of the element 71 in the proper position. In particular, when bonding techniques such as laser welding are used, contact between the beam lead 72 and the conductive pattern 75 on the substrate 74 is essential in order to accomplish the bonding operation. Proper location is important for other bonding techniques including thermocompression and ultrasonic bonding. Also, although not specifically shown, orientation may be achieved by including magnetic films on leads on three sides or in four leads on one side and two on the opposite side as well as other asymmetric configurations.

From the foregoing it will be recognized that an assembly operation for mounting semiconductor elements on substrates can be readily automated by providing magnetic fields in accordance with the mounting pattern on the substrate. The semiconductor elements are fed to the substrate surface where the magnetic fields position and hold the element on the substrate. Very generally, the semiconductor elements are light, of the order of 1000ths of grams so that relatively small magnetic forces are required to produce the necessary movement.

Figure 8:
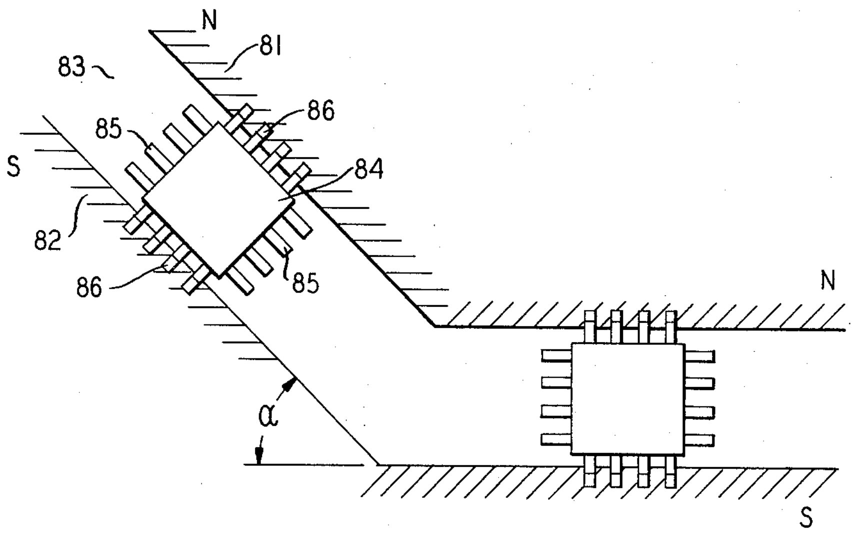
FIG. 8 is a schematic representation of magnetic means for transporting a beam lead element along a prescribed path.

FIG. 8 shows schematically the transport of a beam lead element along an air gap and turned through an angle $\alpha$. Spaced along the air gap are an array of magnetic heads 81–82 which may be energized in succession resulting in a virtual movement of the magnetic field. Each beam lead of the semiconductor element 84 in this case may contain a ferromagnetic film only in the leads 86 on opposite sides thereof. The other beam leads 85 would not contain a ferromagnetic film. Consequently, the semiconductor element is held over the air gap 83 by the magnetic field as described in connection with FIG. 7. By energizing the array of magnetic heads in succession, the element may be transported along the air gap 83 and may be readily turned through the angle $\alpha$ which can be as great as 90°. Thus, it is evident that selective inclusion of a magnetic material within the semiconductor elements may be used to enable particular handling operation.

Generally, it will be understood that ferromagnetic material may be incorporated in semiconductor elements in a variety of modes depending on the purpose served. Such material may be used in elements not fabricated with beam leads but in which the magnetic film is formed in a pattern related to the electrical configuration of the element thereby to enable handling operations such as orientation during assembly. Where "hold down" of beam leads for laser bonding is essential, orientation may be provided, on the one hand, by an asymmetrically patterned film on the surface of the semiconductor body and all beam leads may contain ferromagnetic material. Given the concept of magnetic means in accordance with this invention to enable semiconductor element handling, various combinations of modes for incorporating magnetically responsive material will be apparent to those skilled in the art.

From the foregoing it will be apparent that magnetic means may be employed beginning with the fabrication of an array of devices in slice form to hold the individual elements in their proper orientation and to enable their transportation to final assembly location. For example, a pattern of magnetic heads may retain the elements in position as they are separated typically by etching in the final slice fabrication step. Magnetic means may then be used to transport the elements from their location in the separated slice retaining their initial orientation to the bonding or other assembly location. For example, techniques such as so-called compliant bonding may be utilized by providing magnetic means associated with a soft metal carrier strip or tape. Moreover, although it is desirable to provide some retaining means during movement of the semiconductor elements from slice to assembly location in order to preclude damage or even loss as suggested hereinbefore, by selective inclusion of the ferromagnetic films in the semiconductor element, and with a corresponding arrangement of the magnetic fields in the assembly apparatus, elements may be automatically oriented even though they are moved to the assembly location in random fashion. These and other arrangements will be apparent to those skilled in the art by utilizing the principles of this invention.

In the specific description of embodiments of this invention, particular materials and structures have been disclosed. However, the invention is not restricted to these particular materials or methods. For example, dielectric films of silicon dioxide and silicon nitride have been referred to, but additionally, films of aluminum oxide, various mixed silicates and the like may also be used. Likewise, the selective incorporation of ferromagnetic material is not restricted to silicon but may be applied to a variety of useful semiconductor materials.

Accordingly, although the invention has been disclosed in terms of particular arrangements and structures, it will be understood that other arrangements may be devised by those skilled in the art which likewise will fall within the spirit and scope of the invention.

In particular, although the disclosure is directed primarily to semiconductor elements, it will be recognized that the principles of magnetic handling can be applied to microelectronic elements of similar dimensions and structural arrangement.

What is claimed is:

1. A method of manipulating a beam lead semiconductor element comprising providing ferromagnetic material in said element in accordance with a pattern, said pattern related to the electrical configuration of said element, and exposing said element in a magnetic field having a restricted and particular orientation related to said pattern, said field having sufficient strength to attract and retain said semiconductor element in accordance with said orientation and said pattern.

2. The method in accordance with claim 1 in which said magnetic field is arranged to exhibit a virtual movement so as to produce transport of said semiconductor element.

* * * * *